April 1, 1952  J. S. BURGE ET AL  2,591,047
CONDENSER WINDING TESTING AND SORTING APPARATUS
Filed April 21, 1948  13 Sheets-Sheet 1

April 1, 1952　　　J. S. BURGE ET AL　　　2,591,047
CONDENSER WINDING TESTING AND SORTING APPARATUS
Filed April 21, 1948　　　　　　　　　　　　13 Sheets-Sheet 2

INVENTORS

INVENTORS
James S. Burge
Hilton J. McKee
Warren M. Rider
BY Loris H. Conrad
Floyd J. Foust
Spencer Hardman & Fehr
their attorneys April 1, 1952  J. S. BURGE ET AL  2,591,047
CONDENSER WINDING TESTING AND SORTING APPARATUS
Filed April 21, 1948  13 Sheets-Sheet 4
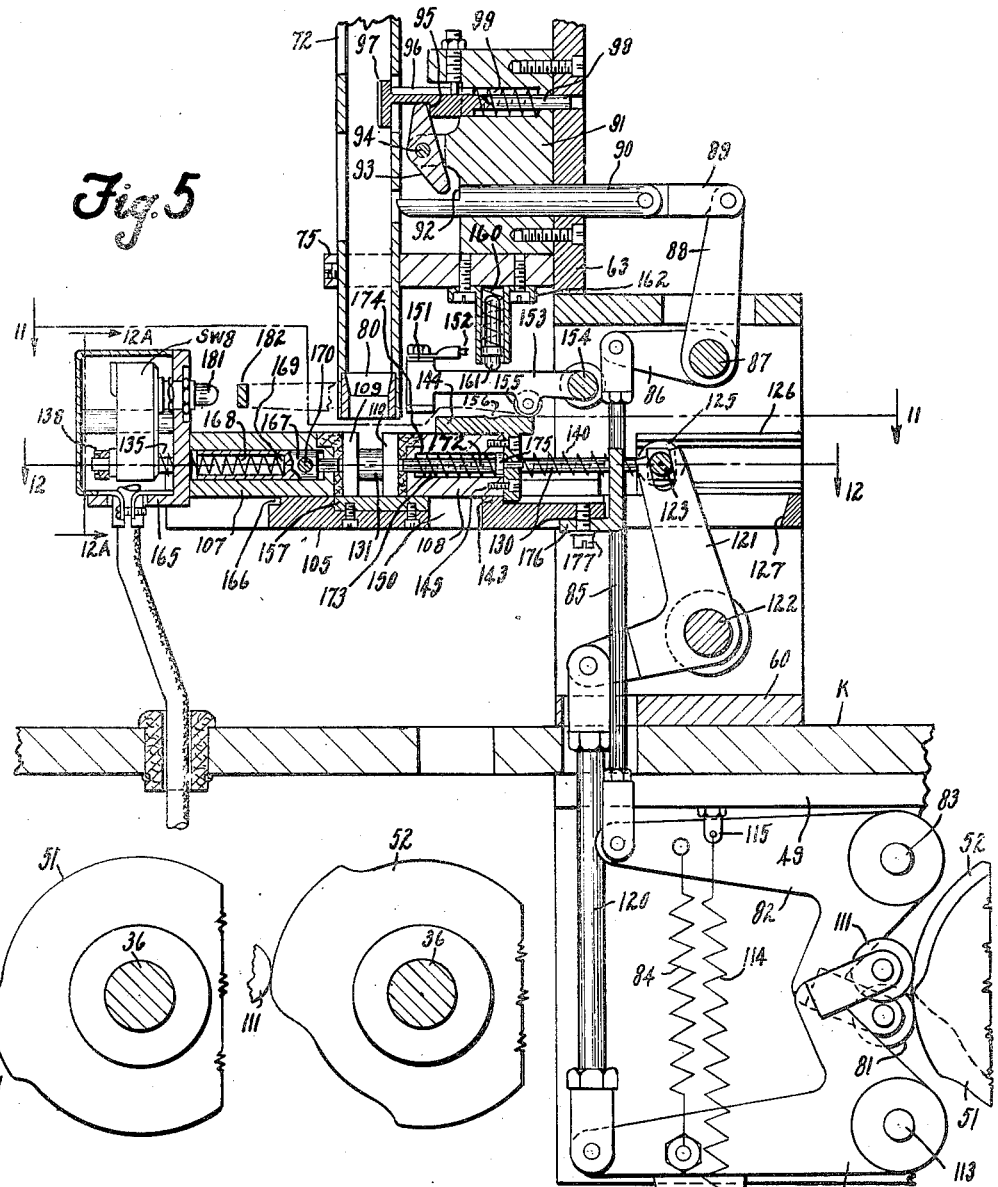

April 1, 1952  J. S. BURGE ET AL  2,591,047
CONDENSER WINDING TESTING AND SORTING APPARATUS
Filed April 21, 1948  13 Sheets-Sheet 5

April 1, 1952  J. S. BURGE ET AL  2,591,047
CONDENSER WINDING TESTING AND SORTING APPARATUS
Filed April 21, 1948  13 Sheets-Sheet 6

James S. Burge
Hilton J. McKee
Warren M. Rider
Loris H. Conrad
Floyd J. Foust
INVENTORS BY Spencer Hardman
and Fehr
their attorneys

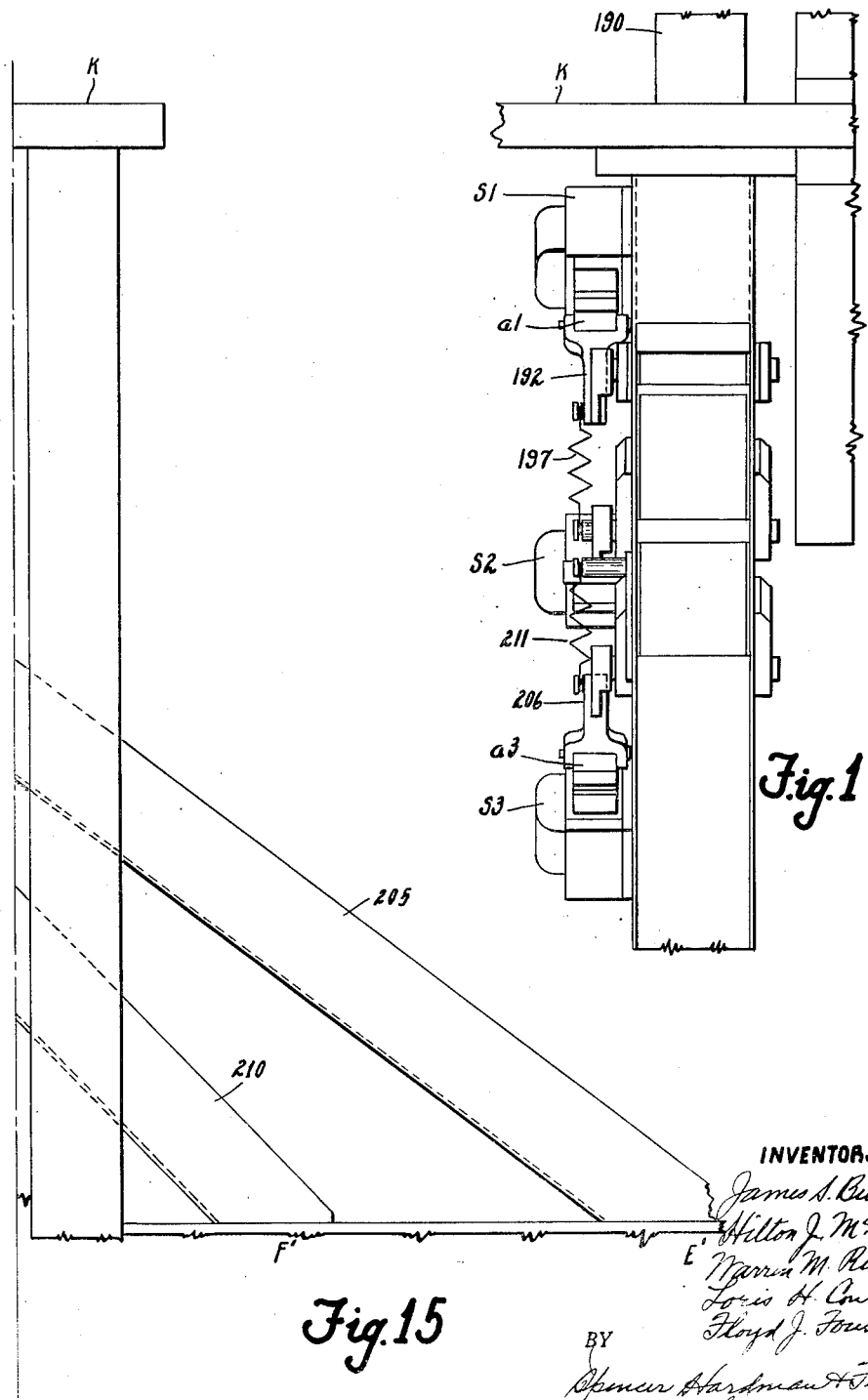

April 1, 1952   J. S. BURGE ET AL   2,591,047
CONDENSER WINDING TESTING AND SORTING APPARATUS
Filed April 21, 1948   13 Sheets-Sheet 11

INVENTORS

Patented Apr. 1, 1952

2,591,047

UNITED STATES PATENT OFFICE 2,591,047

CONDENSER WINDING TESTING AND SORTING APPARATUS

James S. Burge, Anderson, Hilton J. McKee, Middletown, and Warren M. Rider, Loris H. Conrad, and Floyd J. Foust, Anderson, Ind., assignors to General Motors Corporation, Detroit, Mich., a corporation of Delaware Application April 21, 1948, Serial No. 22,454

9 Claims. (Cl. 209—75)

This invention relates to the manufacture of electrical condensers.

An object of the invention is to provide a machine for inspecting condenser windings for oversize outside diameter, for short circuit and for capacity above a high limit or below a low limit. The machine provides for the segregation of tested condensers into the following groups: oversize condensers, condensers which are short circuited, condensers which fail to pass the capacity test and good condensers.

Further objects and advantages of the present invention will be apparent from the following description, reference being had to the accompanying drawings, wherein a preferred embodiment of the present invention is clearly shown.

In the drawings:

Fig. 5 is a sectional view on the line 5—5 o Fig. 4.

Figs. 6 and 7 are fragmentary views of cams 101 and 102 respectively shown in Fig. 5.

Figure 4:
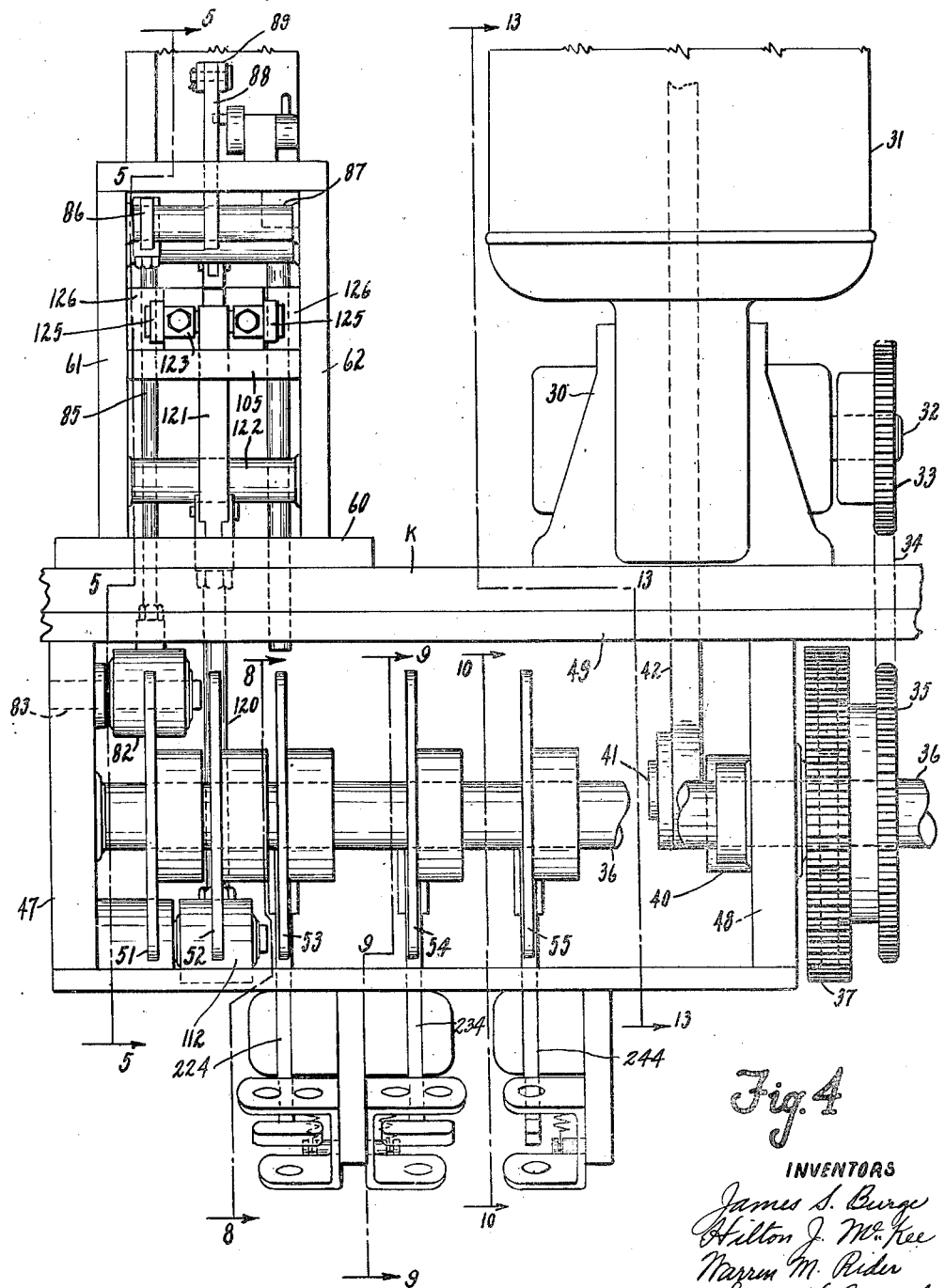
Fig. 4 is a fragmentary rear view drawn to a larger scale than Figs. 2 and 3, but it is taken in the direction of arrow 3 of Fig. 2.
Figure 8:
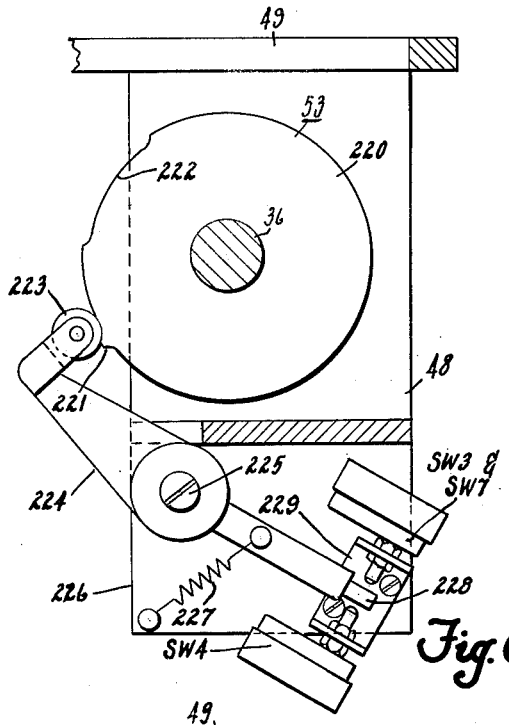
Figure 9:
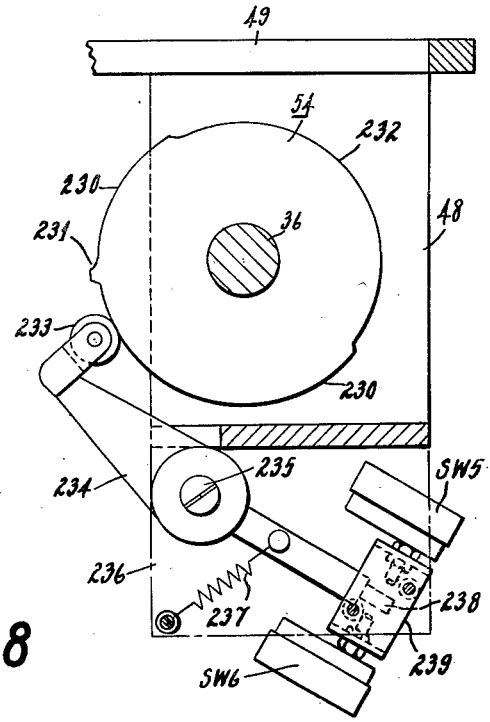
Figure 10:
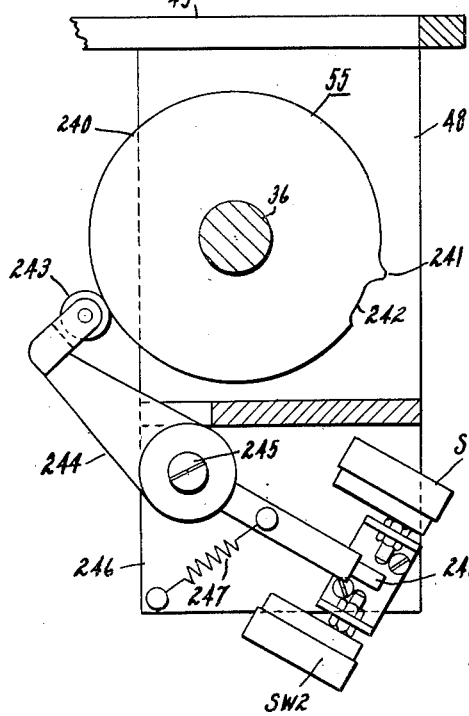

Figs. 8, 9 and 10 are views taken respectively on the lines 8—8, 9—9 and 10—10 of Fig. 4.

Figure 11:
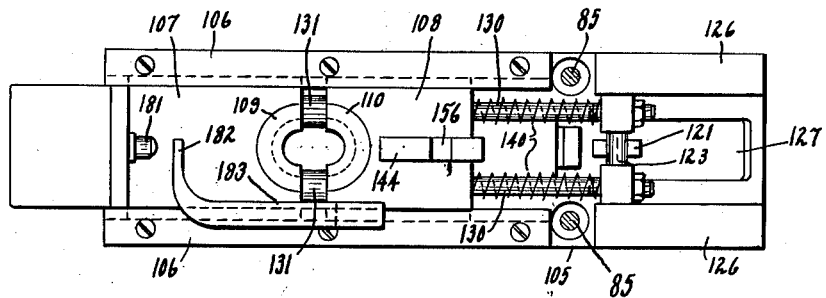
Figure 12:
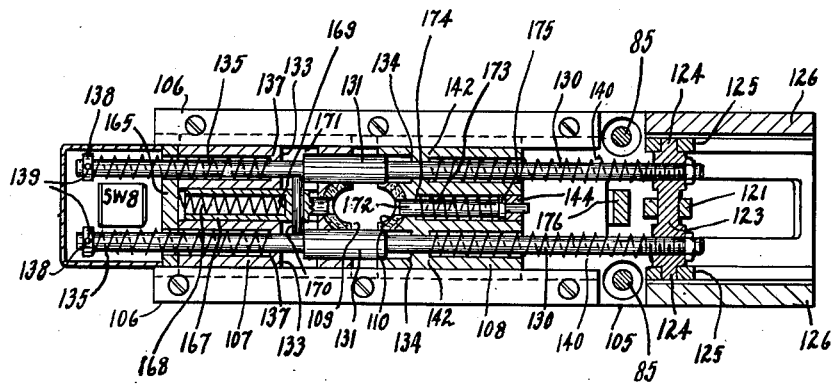

Figs. 11 and 12 are sectional views taken respectively on the lines 11—11 and 12—12 of Fig. 5.

Figure 12A:
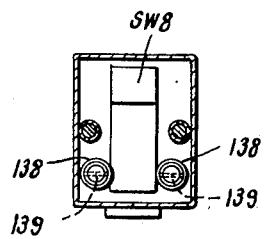

Fig. 12A is a sectional view taken on line 12A—12A of Fig. 5.

Figure 13:
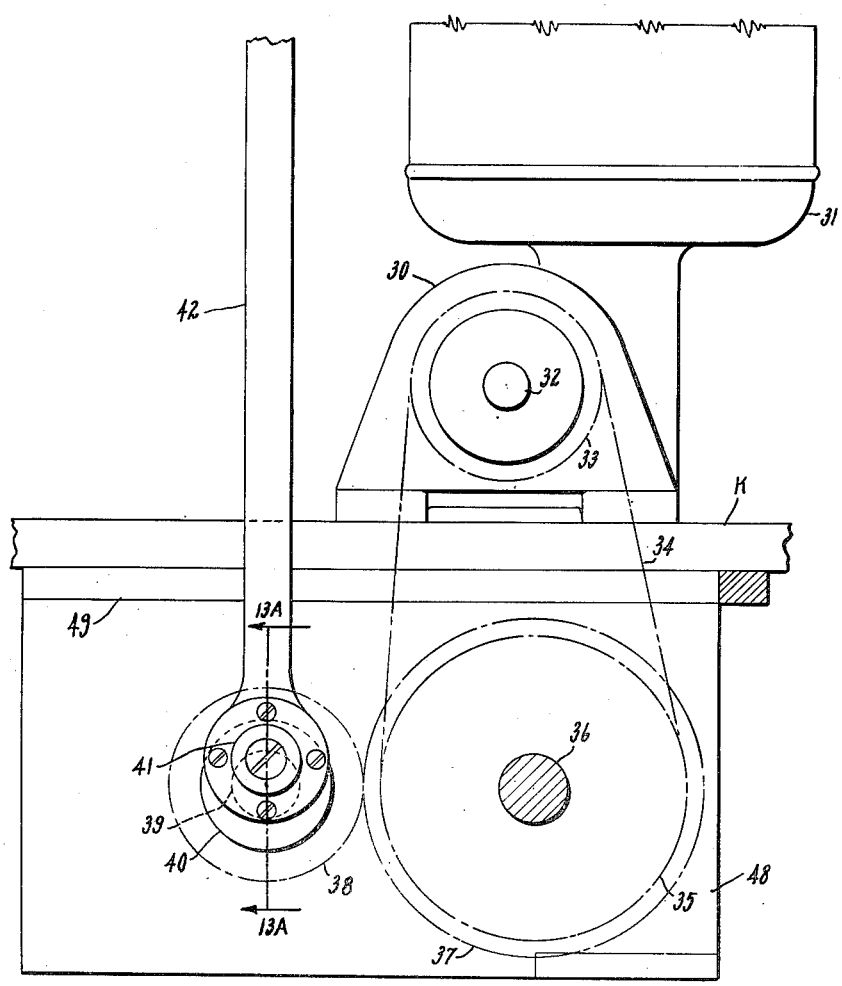

Fig. 13 is a sectional view on the line 13—13 of Fig. 4.

Figure 13A:
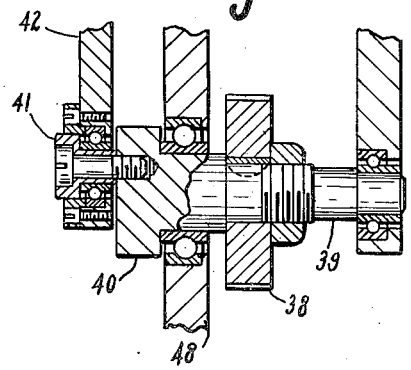

Fig. 13A is a sectional view on line 13A—13A of Fig. 13.

Figure 14:
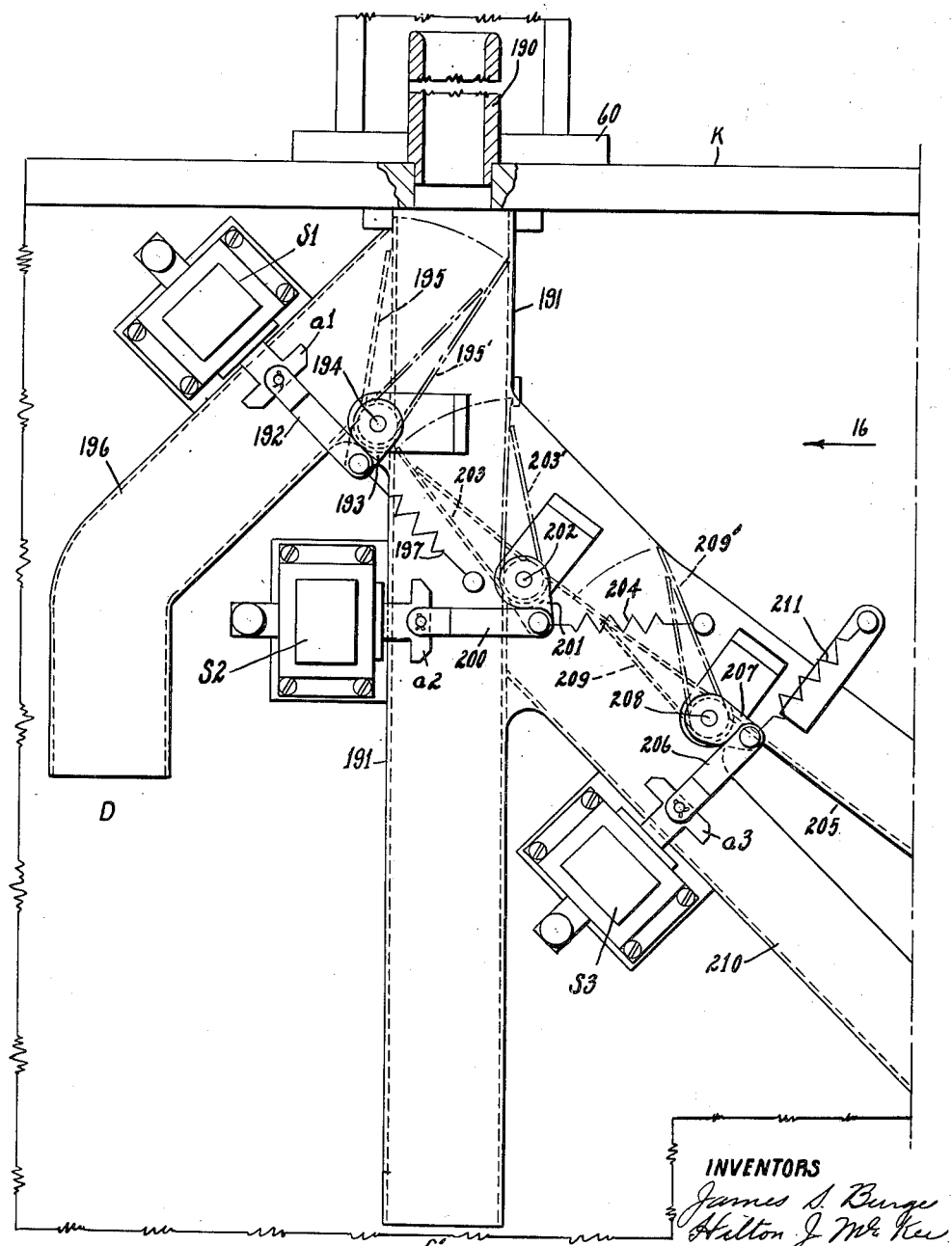

Figs. 14 and 15 constitute a front elevation, partly in section, of the mechanism for segregating good condensers and condensers which failed to pass the tests.

Fig. 16 is a fragmentary view in the direction of arrow 16 of Fig. 14.

Figure 17:
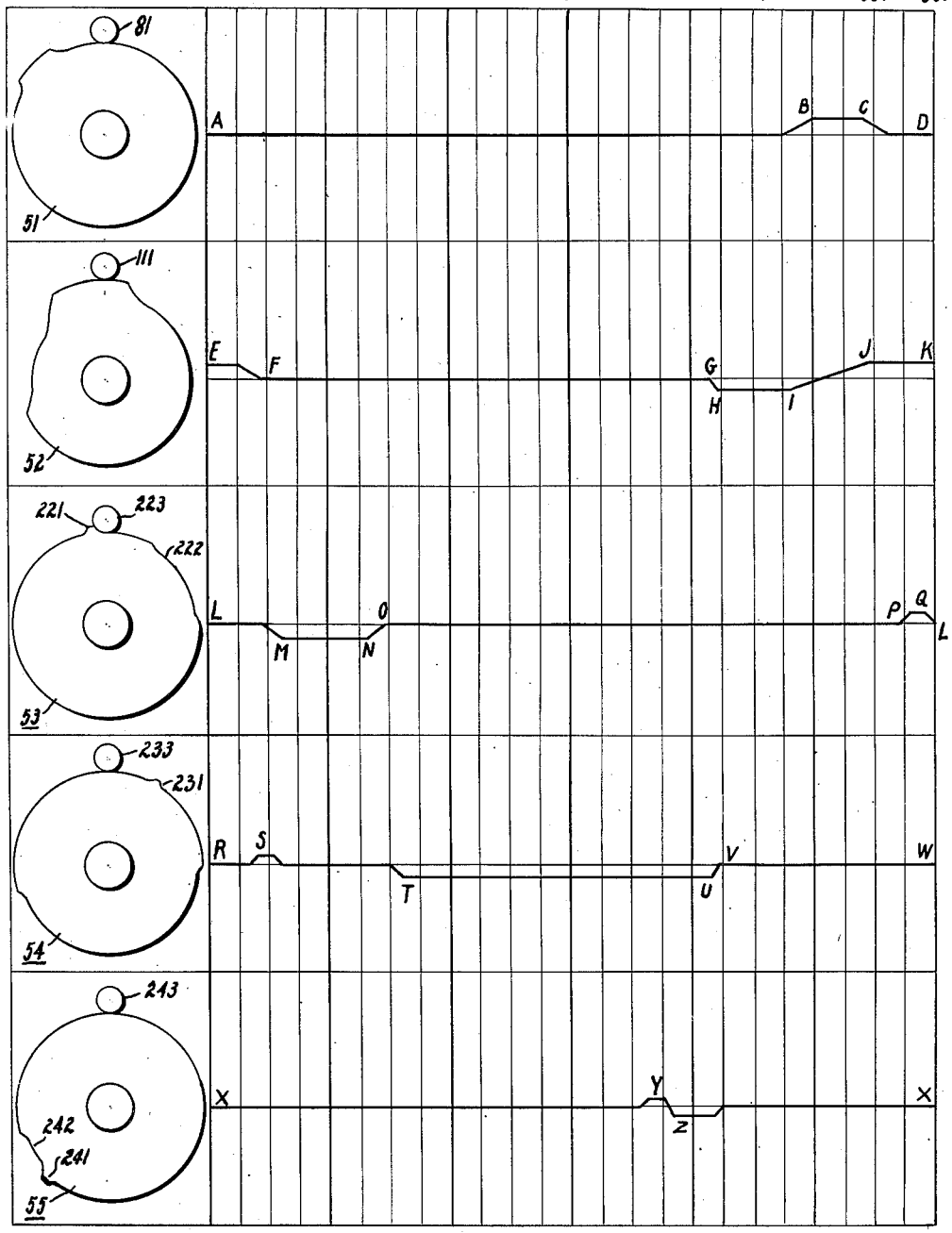

Fig. 17 is a chart showing the functions of the various cams.

Figure 18:
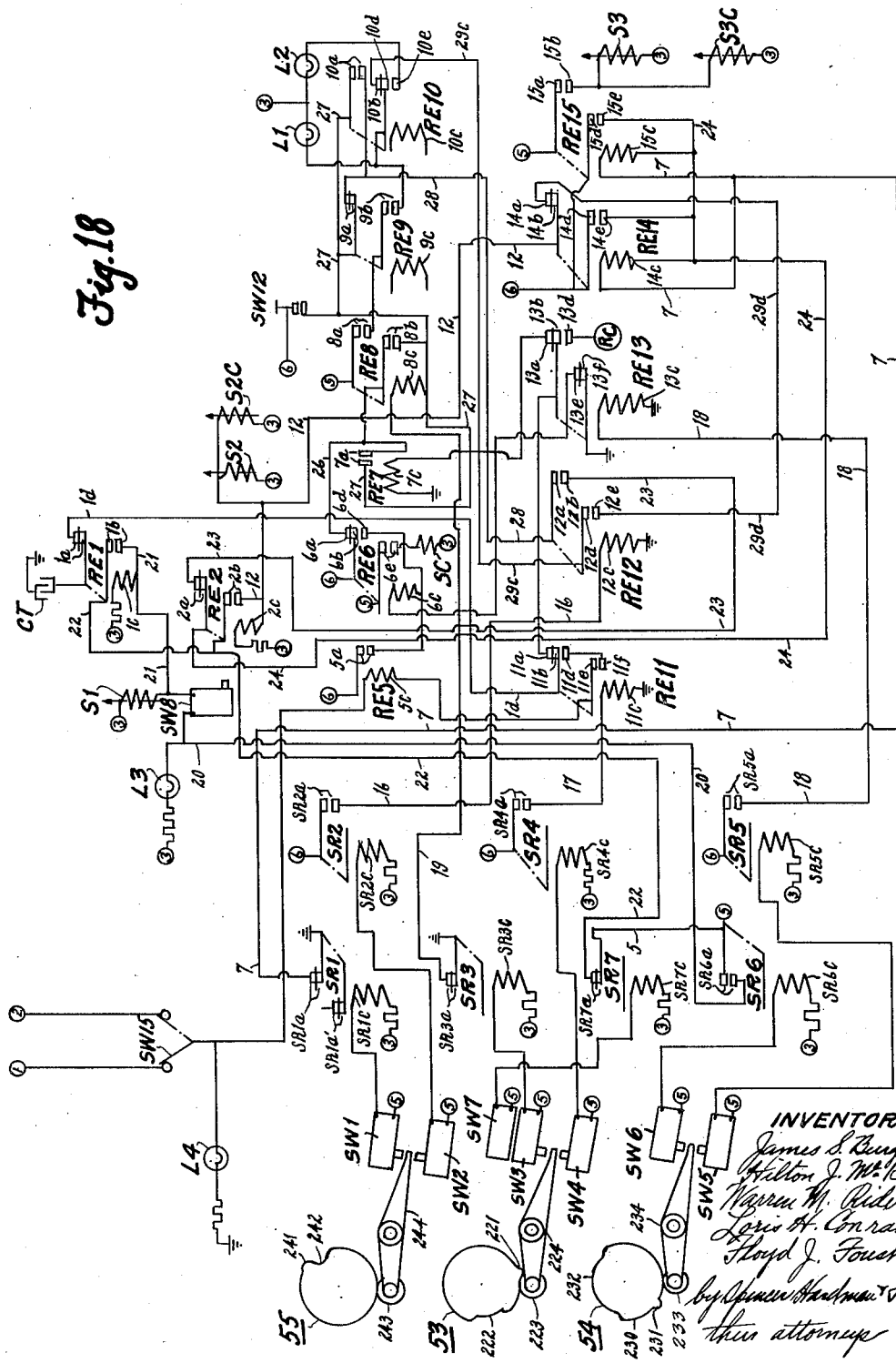
Figure 19:
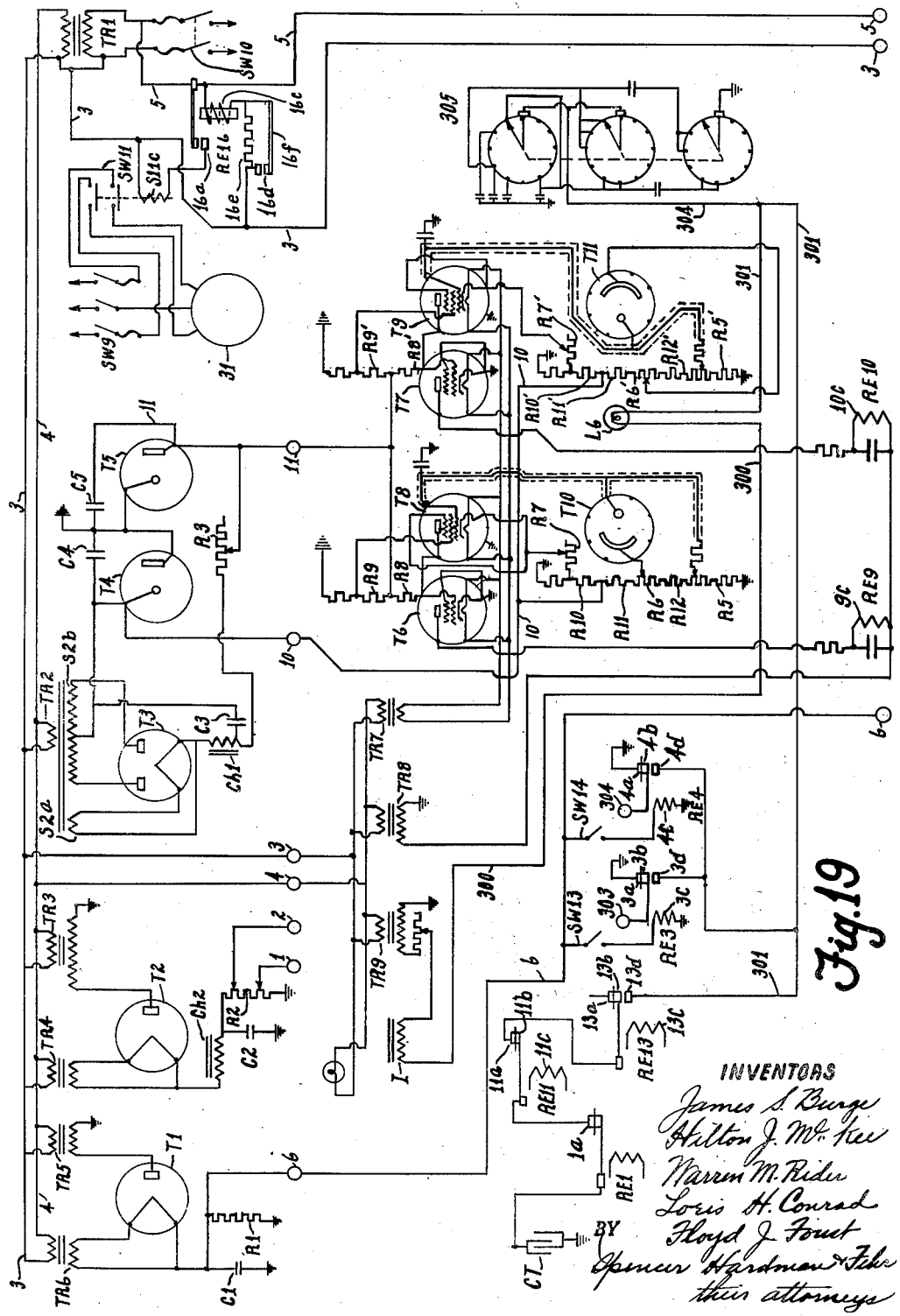
Figure 20:
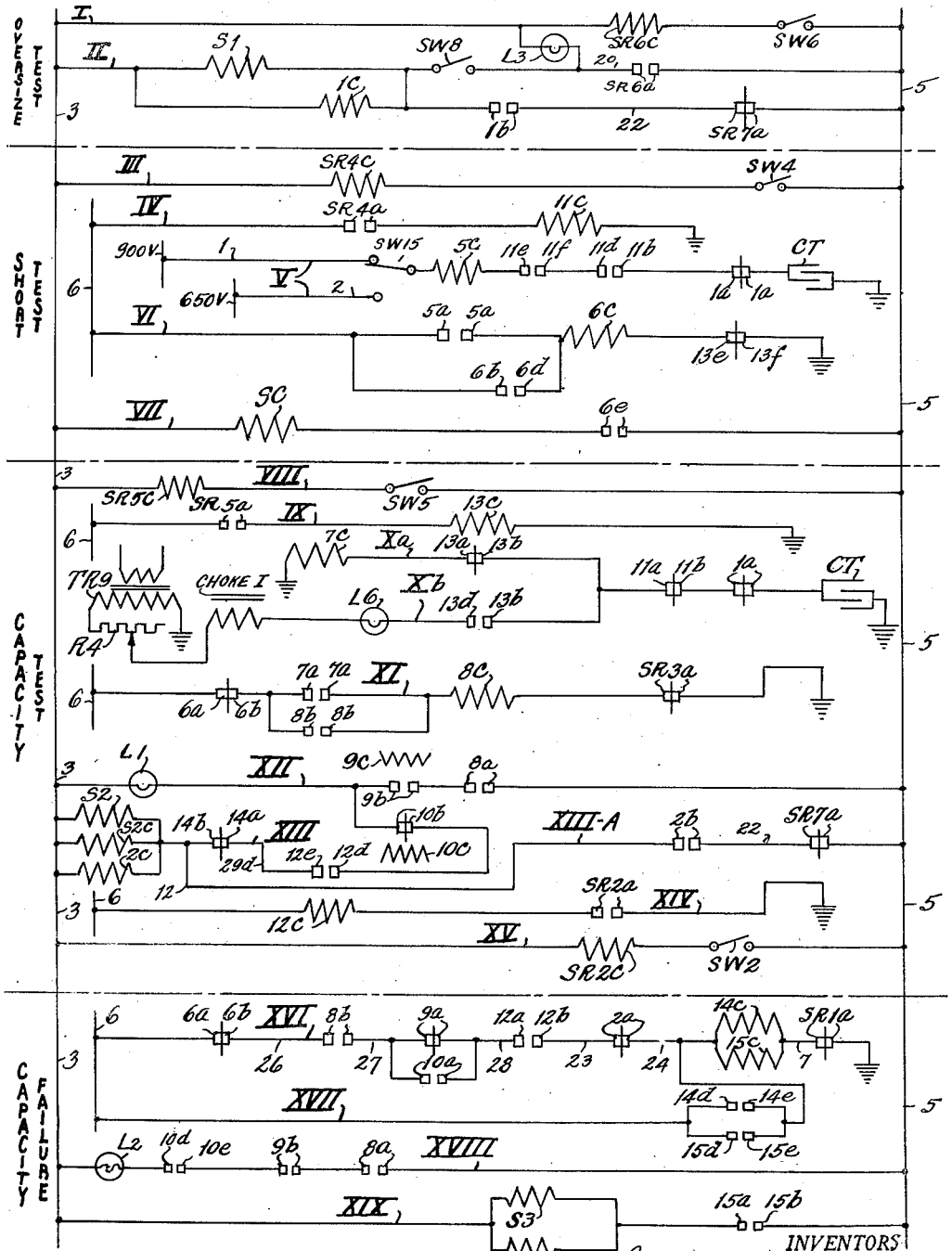

Figs. 18, 19 and 20 are wiring diagrams of the electric circuits included in the present invention.

Figure 1:
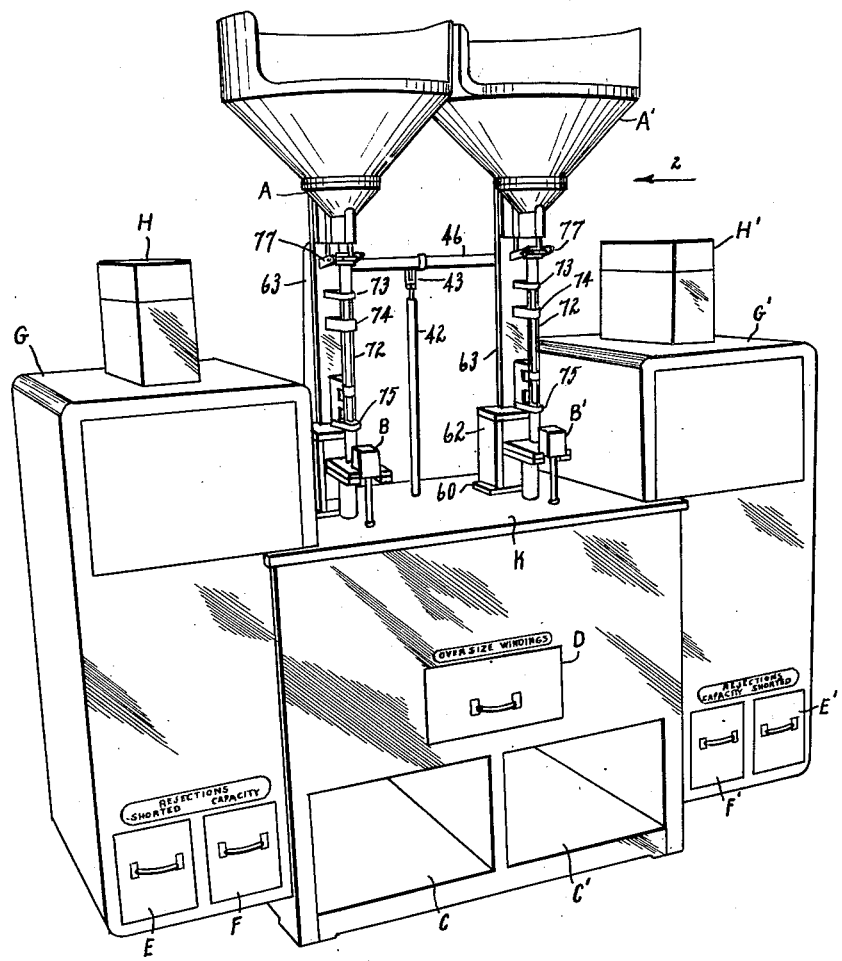
Fig. 1 is a perspective view of a condenser inspecting machine embodying the present invention.

Referring to Fig. 1, the machine is a duplex machine having hopper feeds A and A' by which condenser windings are fed singly to shuttles B and B'. These shuttles move the condensers from a loading station to an intermediate station where they are tested and then to a discharge station. If the condenser winding tests good, when it is released from the shuttle at the discharge station, it will gravitate vertically through a tube into a bin C or C'. If the condenser is oversize, it will be diverted from the vertical passage into a drawer D. If the condenser has passed the oversize test, but fails in the short test, it will be diverted from the vertical passage into a chute which terminates at a drawer E or E'. If the condenser has passed the oversize test or the short test, but failed in the capacity test, it will be diverted into a chute which terminates into a drawer F or F'. In the cabinets G and G' there are located the electrical testing equipment for the condensers which are fed respectively by the hopper feeds A and A'. H and H' are the cabinets which house the counters which count the shorted condensers, the condensers which fail to pass the capacity test and the condensers which pass all tests. K is a table which forms the top of a central cabinet.

Referring to Figs. 4 and 13, table K supports a housing 30 for a speed reducer which is driven by an electric motor 31 which through a gearing drives a shaft 32. Shaft 32 drives a sprocket 33 connected by a chain 34 with a sprocket 35 which is supported by a camshaft 36 driving a gear 37 meshing with a gear 38 which drives a shaft 39. Shaft 39 is integral with a crank disc 40 carrying a crank pin 41 pivotally connected with a link 42 which terminates in a clevis 43 (Fig. 2) pivotally connected at 44 with a lever 45 which is attached to a shaft 46 (Fig. 3). Camshaft 36 is journaled in bearings supported by plates 47 and 48 fixed to a plate 49 which is fixed to the table K. Shaft 39 is journaled in the plate 48. The shaft 36 drives cams 51, 52, 53, 54 and 55. Each inspection mechanism of the duplex machine has two cams 51 and 52, but cams 53, 54 and 55 serve both unit mechanisms. The shaft 46 which is oscillated by the link 42 is operatively connected with hopper feeds of both units.

Figure 2:
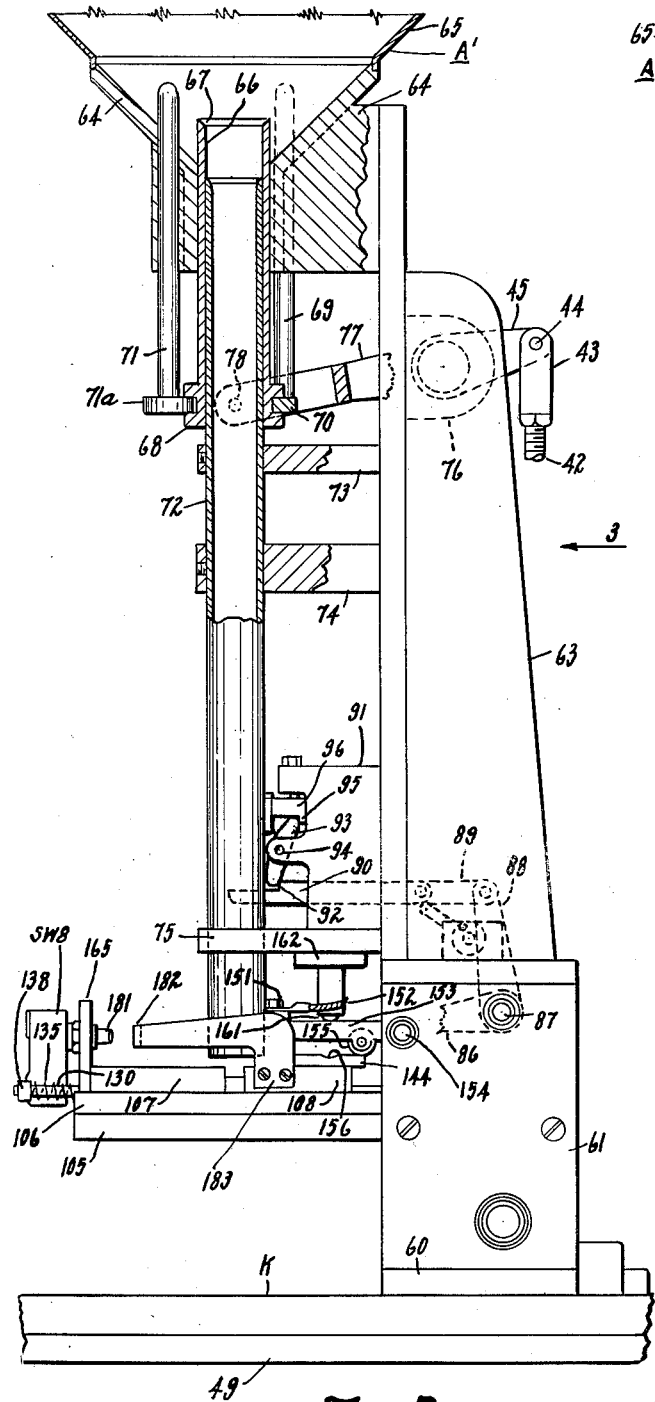
Fig. 2 is a fragmentary side view in the direction of arrow 2 of Fig. 1.
Figure 3:
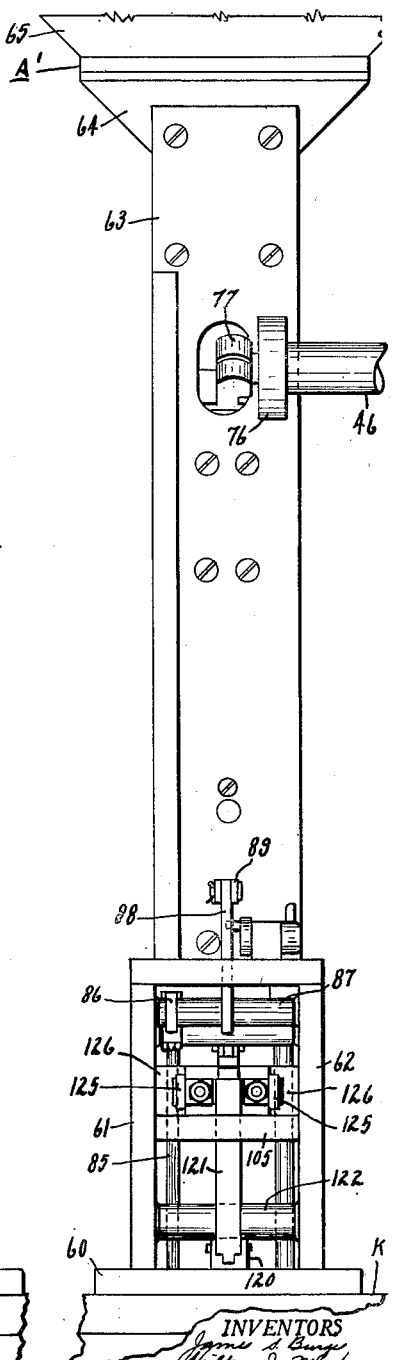
Fig. 3 is a view in the direction of arrow 3 of Fig. 2.

Referring to Figs. 2 and 3, table K supports a plate 60 secured to two plates 61 and 62 which support a frame 63 which at its top supports a bracket 64 which supports a hopper 65. Bracket 64 which forms the bottom end of the hopper provides a tubular guide for a vertically movable slide tube 66 having a flared opening and having a grooved collar 68. Bracket 64 provides guides for two vertically movable rods 69 and one rod 71. Rods 69 are attached to plate 70 received by collar 68; and rod 71 has a disc 71a received by the collar 68. The plunger tube 66 receives a tube 72 supported by brackets 73, 74 and 75 attached to frame 63. The shaft 46 is supported by two bearings 76, each one being attached to a frame 63. Each end of the shaft 46 is attached to a bifurcated lever 77 carrying pins 78 which are received by the groove of collar 68. Therefore, while the shaft 46 is being oscillated by the crank and link mechanism, the plunger tube 66 and rods 69 and 71 are caused to oscillate thereby causing condenser windings to enter the plunger tube and the feed tube 72.

The lower end of feed tube 72 receives a bushing 80 (Fig. 5) which causes the winding to occupy a central position within the tube 72 as it leaves the tube. The condenser windings are caused to drop singly through the bushing 80 by a mechanism which includes the cam 51 which engages a roller 81 carried by a lever 82 pivotally supported at 83 and urged counterclockwise by a spring 84. Lever 82 is connected by a link 85 with a lever 86 attached to shaft 87 supported by plates 61 and 62 (Fig. 3). Shaft 87 is connected with a lever 88 connected by link 89 with a slide 90 guided by a bracket 91 attached to frame 63. Slide 90 has a shoulder 92 engageable with a lever 93 pivotally supported at 94 by the bracket 91 and engageable with a shoulder 95 of a slide 96 guided by the bracket 91 and having an arcuate pad adapted to engage the condenser windings. The slide 96 is attached to a rod 98 surrounded by a spring 99 which urges the slide 96 toward the left. As the slide 90 moves left, it passes through an opening in the tube 72 and into the tube a sufficient distance to catch a condenser winding before the shoulder 92 engages the lever 93 and causes the slide 96 to move right to release a condenser winding which falls upon the slide 90. At the same time there will be another condenser winding adjacent to the pad 97. When the slide 90 moves right to release the condenser winding resting upon it, the pad 97 will have been released and will have been actuated by the spring 99 against the condenser winding which was adjacent to pad 97 before the condenser winding below the retained winding is released by right movement of the slide 90. In this way the condenser windings pass singly through the bushing 80 at the bottom of the tube 72.

The plates 61 and 62 (Figs. 2 and 3) support a plate 105 supporting rials 106 which guide for horizontal movement two jaws 107 and 108 having arcuate notches (Fig. 12) for receiving non-conducting, semi-cylindrical members 109 and 110 which engage the condenser windings when the jaws 107 and 108 are permitted to engage each other. The movements of these jaws are controlled by the cam 52 (Fig. 5) engageable with a cam follower 111 carried by lever 112 pivotally supported at 113 and urged clockwise by a spring 114 attached to a stud 115 carried by plate 49 and to a stud 116 carried by an extension 117 of lever 112. Lever 112 is connected by a link 120 with a bell crank lever 121 attached to a shaft 122 journaled in bearings supported by the plates 61 and 62. The forked upper end of lever 121 receives a bar 123 providing trunnions 124 for rollers 125 which are guided by rails 126 supported by plates 61 and 62 (Fig. 3). Lever 121 extends through an opening 127 in plate 105. Bar 123 is attached to rods 130 (Fig. 12) which pass through both jaws 107 and 108 and which have enlarged portions 131 adapted to engage either the shoulders 133 of the jaws 107 or the shoulders 134 of jaws 108. Springs 135 surrounding the rods 130 are confined under compression between shoulders 137 of the jaw 107 and cup washers 138 retained on the rods by pins 139. Springs 140 which surround the rods 130 are confined under compression between the bar 123 and shoulders 142 of the jaw 108. During counterclockwise movement of lever 121 (Fig. 5) the jaws 107, 108 move left into the position shown, the jaw 107 being located in the position shown in Figs. 5 and 12 by virtue of engagement of the enlarged portion 131 of rod 130 with the shoulders 133 of the jaw 107. Jaw 108 which is then urged left by the springs 140 is arrested when it arrives at the position shown in Figs. 5 and 12 by virtue of engagement with a stop shoulder 143 provided by plate 105 with a bracket 144 which screws 145 attach to the jaw 108. During clockwise movement of lever 121, the jaw 108 will remain in the position last mentioned until the enlarged portions 131 of rods 130 pick up the jaw 108 by engaging its stop shoulders 134. At the same time the jaw 107 will have moved into engagement with the jaw 108 so that a condenser winding which has been located between the members 109 and 110 will be gripped by them. The cam 52 is so shaped as to cause the condenser winding to be located for a brief time in a position intermediate the bushing 80 and a discharge opening 150 in the plate 105 which is in alignment with a discharge tube which is to be described later. When the condenser is in this intermediate position it is engaged by a contact 151 which is connected with a lead wire 152 and which is insulatingly supported by lever 153 attached to a shaft 154 pivotally supported by the plates 61 and 62. Lever 153 carries a roller 155 for engaging the upper surface of the bracket 144, said upper surface having a groove 156 for receiving the roller 155 when the condenser is in the intermediate position. Therefore, the contact 151 is permitted to engage the upper foil margin of the condenser winding while the lower foil margin engages a brass plate 157 supported by the plate 105, thereby connecting the lower foil margin with a ground circuit. The condenser winding is pressed against the plate 157 and receives the electrode or contact by pressure applied from a spring 160 surrounding a plunger 161 engaging the lever 153, said plunger and spring being retained by a bracket 162 attached to the bracket 75.

The condenser remains in the intermediate position for the time sufficient for testing purposes. Then the clockwise motion of the lever 121 continues to cause the jaws 107 and 108 to move further toward the right. Motion toward the right of jaw 107 is arrested while jaw 108 continues to move toward the right so that the jaws will be separated when aligned with the hole 150, just as they had been separated when aligned with the tube 72. Motion of jaw 107 to the right stops when a bracket 165 attached thereto engages shoulder 166 of plate 105.

To prevent the sticking of the condenser winding to either of the members 109 or 110 when the jaws separate, ejector plungers are provided. Jaw 107 supports a plunger 167 urged right by a spring 168 located between the bracket 165 and a surface 169 of the plunger. A pin 170 attached to the plunger 167 and received by slots 171 in the jaw 107 limits movement of plunger 167 toward the right when the jaws are in discharge position, by virtue of engagement of pin 170 with the right-hand ends of the slots 171. However, when the jaws are in the loading position the pin 170 is engaged by the left ends of the enlarged portions 131 of rod 130 so that the plunger end 167 would not extend to the right beyond the interior of the jaw lining 109. The jaw 108 carries an ejector pin 172 urged right by a spring 173 confined between shoulder 174 of the jaw and shoulder 175 of pin 172, the right movement of said shoulder being limited by a plug 175 in the paw 108. When the jaw 108 is moved into the unloading position, the right end of pin 172 engages a bracket 176 which screws 177 (Fig. 5) attach to the plate 105. In the unloading position of the jaws, both pins 167 and 172 extend within the members 109 and 110 in order to force the condenser windings from these members in case it tends to cling thereto. When the jaws are in the loading position, both pins are retracted from the interior of the jaw liners 109 and 110.

The bracket 165 (Fig. 5) which moves with the jaw 107 supports a normally closed miscroswitch SW8, the plunger 181 of which is in alignment with a bar 182 providing a bracket 183 attached to the jaw 108. If the condenser winding is not oversize so that the jaws can come together during their movement toward the right, the switch plunger 181 will be engaged by the bar 182 and the switch SW8 will be opened and the winding will not be diverted to the oversize drawer D (Fig. 1). However if the condenser winding is oversize so that the jaws do not come together, the switch SW8 will remain closed and the winding will be delivered to the oversize drawer.

Referring to Figs. 14, 15 and 16 after the jaws open at the discharge station, the condenser winding falls through a tube 190 and into a tube 191 which is supported by the table K. If the condenser had failed to pass the oversize test before the winding is released, a solenoid S1 is energized and its armature a1 will be attracted upwardly, thereby causing upward movement of the link 192 and clockwise movements of a lever 193, a shaft 194 and a plate or trap 195, thereby causing the latter to occupy the position 195'. Therefore the oversize condenser will be diverted by the trap at 195' and will be caused to descend through a branch chute 198 leading to the oversize drawer D. Before the end of the test cycle, the solenoid S1 is deenergized and a spring 197 returns the trap 195 and the armature a1 into the normal position shown in Fig. 14.

If the condenser winding has passed all of the tests, a solenoid S2 will be energized thereby causing its armature a2 and a link 200 attached thereto to move left, thereby causing clockwise movement of the lever 201, shaft 202 and a plate or trap 203, the latter moving into the position 203'. Therefore all good condensers will pass through the tube 191 into a bin C'. However, of the condenser fails to pass either the short-circuit test or the capacity test, the solenoid S2 will not be energized and the trap 203 will remain in the normal position to cause the windings to be diverted to the right from the tube 191. If the condenser fails to pass the short-circuit test, it will gravitate from the plate trap 203 into a chute 205 which leads to the drawer E' (Fig. 15). If the winding passes the short test but fails in the capacity test, a solenoid S3 will be energized thereby causing downward movement of its armature a3 and a link 206 and clockwise movements of lever 207, shaft 208 and a trap 209, the latter moving into the position 209', thereby causing the condenser to descend through the chute 210 into the drawer F'. At the end of the test cycle, the solenoids S2 and S3 are deenergized and the spring 204 returns the trap 203 into the normal position shown and a spring 211 returns the trap 209 into the normal position shown. Briefly, the traps are normally located for diversion of the condenser winding into the short failure drawer E'. An oversize winding causes the trap 195 to move to position 195' to effect diversion into the oversize drawer D. If the condenser passes all tests, the trap 203 moves to position 203' to allow the good condenser to descend through the pipe 191 to the bin C'. If the condenser fails to pass the short test none of the traps move from normal position. If the condenser fails to pass the capacity test but has passed the short-circuit test, the trap 209 moves to position 209'. The arrangement of chutes and traps shown in Figs. 14 and 16 applies to those condensers which are fed by the hopper feed A and are handled by the shuttle B. In the chute and trap arrangement for the left side of the machine, chute 196 is on the right side of tube 191, and chutes 205 and 210 extend to the left of the tube 191.

Referring to Fig. 8, cam 53 driven by shaft 36 has a short lobe 221 extending from its main periphery 220 and a valley 222 extending within its periphery 220. Cam 53 is engaged by a follower 223 carried by a lever 224 pivoted at 225 on a bracket 226 and urged clockwise by a spring 227 which connects the lever with the bracket. Lever 224 carries a bar 228 midway between the plunger of switch SW4 (below the bar) and the plungers of switches SW3 and SW7 (above the bar). These switches are mounted on the bracket 229 attached to bracket 226. When cam lobe 221 engages the roller 223 normally open switches SW3 and SW7 are closed. When the valley 222 receives the roller 223, the normally open switch SW4 is closed.

Cam 54 (Fig. 9) also driven by shaft 36 has a lobe 231 extending from its main periphery 230 and a valley 232 within its main periphery. Cam 54 is engaged by a roller 233 carried by a lever 234 pivotally supported at 235 by bracket 236 and urged clockwise by a spring 237 connected to lever with the bracket. Lever 234 has a bar 238 which is normally located between the plungers and the switches SW6 and SW5 mounted on a bracket 239 attached to bracket 236. When lobe 231 engages the roller, normally open switch SW5 is closed. When valley 232 receives roller 233, normally open switch SW6 is closed.

Cam 55 has a main cylindrical portion 240 from which there extends a lobe 241 and within which there is a valley 242. Cam 55 is engaged by a roller 243 carried by a lever 244 pivoted at 245 upon a bracket 246 and urged clockwise by a spring 247 connecting the lever with the bracket. While the roller 243 is engaging the main portion 240 of the cam 55, a bar 248 is midway between the plungers of switches SW2 and SW1. When valley 242 receives the roller 243, normally open switch SW2 is closed. When lobe 241 engages the roller 243, normally open switch SW1 is closed.

Fig. 17 shows the functions of the various cams for one revolution of the camshaft 36. Lines A—B—C—D represent the operation of cam 51. Line B—C between 300 and 330° shows that the condenser winding is being released and descends upon the jaw 107 then located under the discharge tube and hopper feed.

Lines E—F—G—H—I—J—K represent the operation of cam 52. At J—K and E, the jaws are separated and are under the discharge tube of the hopper feed and the condenser winding is received between them. Between F and G, the winding is gripped between the jaws and is located in the test position where it is contacted by the electrode 151. Between H and I, the jaws are located over the discharge chute and are separated so that the condenser winding may descend.

Lines L—M—N—O—P—Q represent the operation of cam 53. Between M and N the short test is performed when the roller 223 is being received by the valley 222. At Q the lobe 221 engages the roller 223 and a restoration of the short test circuit to normal is effected.

Lines R—S—T—U—V—W represent the functions of cam 54. At S when lobe 231 engages roller 233, restoration to normal of the capacity test circuit is effected. Between T and U the capacity test is performed.

Lines X—Y—Z represent the function of cam 55. At Y, when lobe 241 engages roller 243, there is a release of solenoid circuits which were set up for the previous winding test. The solenoid relays, if conditioned for operation by the tests, will be caused to operate at Z when the valley 242 receives the roller 243.

Referring to Fig. 19, by closing switch SW10, 110 volts A. C. is connected with lines 3 and 5 for operation of cam switch relays SR1 to SR7 (Fig. 18) and solenoids S1, S2, S2C, S3 and S3C. Voltage regulator transformer TR1 receives current from switch SW10 and supplies regulated 110 volt A. C. to lines 3 and 4 with which the primary coils of transformers TR2, TR3, TR4, TR5, TR6, TR7, TR8 and TR9 are connected. Motor 31 is connected with three-phase A. C. by manual switch SW9 and relay switch SW11 whose coil S11c is energized to close contacts when contacts 16a of time delay relay RE16 are closed. Coil 16c of RE16 is connected with line 5 and through heater 16e with line 3. Heater 16e heats bimetal blade 16f which, after a time sufficient for later described tubes to be heated for operation, closes contacts 16d which by-pass heater 16e and directly connect coil 16c with line 3. The motor 31 operates after a time sufficient for heating the tubes.

Cathode of rectifier tube T1 (model 866) is connected with the secondary of TR6 and with filter condenser C1 and resistance R1; and the plate of T1 is connected with the secondary of TR5 which is a 1:1 ratio isolation transformer. 115 volts A. C. is supplied to line 6 for operating certain relays.

Cathode of rectifier tube T2 (model 866) is connected with the secondary of TR4 and with choke CH2, filter condenser C2 and voltage divider resistance R2; and the plate of T2 is connected with the secondary of TR3. 900 volts D. C. is supplied to line 2 and 650 volts D. C. to terminal 1 for condenser break-down test.

Secondary S2a of transformer TR2 is connected with the cathode of tube T3 (model 5Z3) whose plates are connected with the ends of secondary S2b of TR2. Tube T3 together with voltage regulator tubes T4 and T5, choke Ch1, condensers C3, C4 and C5 and variable resistance R3 and secondaries of TR2 constitute the power supply for bias voltage impressed on lines 10 and 11.

Lines 3 and 4 are connected with the primary coils of transformers TR7, TR8 and TR9. The secondary of TR7 supplies current to heat the filaments of tubes T6, T7, T8 and T9. The secondary of TR8 supplies relay operating current to the coils 9c and 10c of relays RE9 and RE10, respectively, provided tubes T6 and T7, respectively, will allow such current to pass.

Condenser winding CT under test is connected at the proper time into a resonant circuit which includes grounded secondary of TR9, variable resistance, inductance I, wire 300, lamp L6, wire 301, contacts 13d, 13b of relay RE13 when closed, contacts 11a, 11b of relay RE11, contacts 1a of relay RE1, condenser CT and ground. Wire 304 connects wire 301 with padder 305.

Rays from lamp L6 are focused on photo-electric cells T10 and T11 having shielded connections with the lower grids of amplifier tubes T8 and T9 (model 6J7) respectively. The effects of light upon the cells T10 and T11 are amplified and are passed to the lower, control grids of tubes T6 and T7 (model 2050) respectively. If the condenser winding CT has capacity above the low limit, tube T6 will pass current to coil 9c of relay RE9 which will operate. If the winding CT has capacity under the high limit, tube T7 will not pass current to coil 10c and relay RE10 will not operate. If relay RE9 operates and relay RE10 does not operate, by means to be described, the winding will pass after the test from the shuttle to the "good" bin. If the winding CT has capacity below the low limit, relay RE9 does not operate; and, if winding CT has capacity above the high limit, both relays RE9 and RE10 operate; and, in either case, the winding passes after the test from the shuttle to the "capacity failure" bin.

Before testing condenser winding CT for capacity between certain low and high limits, a standard condenser having capacity at the required low limit is connected between ground and terminal 303, and a standard condenser having capacity just over the high limit is connected between ground and terminal 304. Switch SW13 is closed to cause coil 3c of relay RE3 to be connected with line 6 and ground. Relay contacts 3b and 3d are engaged to connect the low limit condenser with the resonant circuit. Adjustments of one or more of resistances R5, R6, R7 are made so that tube T6 will just pass the current required for operation of relay RE9. Then switch SW13 is opened and switch SW14 is closed to connect the high capacity condenser into the resonant circuit. Similar adjustment of resistances R5', R6', R7' are made so that tube T7 will just pass current to the coil 10c of relay RE10. Padder 305 (Mallory Model 1331L) (connected by wire 304 with wire 301) provides for adjustment of capacity in parallel with the standard condensers so that the apparatus can function within a range which includes the range of the test. Resistances R5 and R5' provide coarse adjustments of low and high limits respectively; and resistances R7 and R7' provide fine adjustments.

Line 11 supplies bias voltage through resistances R8 and R8' to the lower, control grids of tubes T6 and T7 respectively and to the plate of tubes T8 and T9 respectively. Line 11 supplies bias voltage through resistances R9 and R9' to the middle grids of tubes T6 and T3 respectively.

Line 10 supplies bias voltage through resistances R10, R7 and R10', R7' respectively to the cathode and upper grids of tubes T8 and T9 respectively. Line 10 is connected through resistances R11, R6, R12, R5 and R11', R6', R12', R5' respectively with elements of cells T10 and T11.

The control of relays other than RE3, RE4, RE9 and RE10 will now be described with reference to Fig. 18.

When switch SW1 closes, coil SR1c is connected with lines 3 and 5. Relay SR1 opens its normally closed contacts SR1a. Normally they connect line 7 and coils 14c and 15c of relays RE14 and RE15 respectively with ground. Relay SR1 has a second set of contacts SR1a' which have a similar function with respect to duplicate testing apparatus which serves the condenser windings handled by the left portion of the duplicate machine. The other switch relays SR2—SR7 have duplicate or second sets of contacts (not shown) having the same function as their numbered and lettered contacts. In this way, one set of cams 55, 53, 54, switches SW1—SW7 and switch relays SR1—SR7 serves duplicate testing apparatuses.

When switch SW2 closes, coil SR2c is connected with lines 3 and 5, and normally open contacts SR2a close to connect line 6 with wire 16 and coil 12c having ground return to relay power supply. Relay RE12 closes normally open contacts 12a, 12b and 12d, 12e.

When switch SW3 closes, coil SR3c is connected with lines 3 and 5 and normally closed contacts SR3a open. Normally these contacts connect ground to wire 19 connected with coil 8c of relay RE8.

When switch SW4 closes, coil SR4c is connected with lines 3 and 5. Normally open contacts SR4a of relay SR4 close to connect line 6 with wire 17 connected with grounded coil 11c of relay RE11 which then separates contacts 11a, 11b and engages contacts 11b, 11d and contacts 11e, 11f.

When switch SW5 closes, coil SR5c is connected with lines 3 and 5. Normally open contacts SR5a close to connect line 6 with wire 18 connected with grounded coil 13c of relay RE13 which then separates contacts 13a, 13b and 13e, 13f and engages contacts 13b, 13d.

When switch SW6 closes, coil SR6c is connected with lines 3 and 5. Normally open contacts SR6a close to connect line 5 with wire 20 connected to lamp L3 (connected with line 3) and to switch SW8 which, if remaining closed, causes energization of solenoid S1 and relay RE1 which will open contacts 1a and close contacts 1b.

When switch SW7 closes, coil SR7c is connected with lines 3 and 5. Normally engaged contacts SR7a open. Normally these contacts connect line 5 with wire 22 connected with upper contact 1b of relay RE1 and with upper contact 2b of relay RE2.

For the oversize test, at about 28° on the chart, Fig. 17, cam 54 closes switch SW6, line 5 (refer to circuits I and II, Fig. 20) is connected by wire 20 with lamp L3 which burns and with one terminal of switch SW8. If the condenser is not oversize, switch SW8 will open and solenoid S1 and relay RE1 will not operate. If the condenser is oversize, switch SW8 will remain closed and solenoid S1 and relay RE1 will operate. Relay RE1 will separate contacts 1a and engage contacts 1b, thereby connecting wires 21 and 22. Since SW7 does not close until just before the end of the cycle, wire 22 remains connected with line 5 until that time. Consequently relay coil RE1c and solenoid S1 remain energized. No further test of the condenser winding CT will be made because it has been disconnected by relay RE1 which opens contacts 1a (circuits V, Xa and Xb, Fig. 20); and the winding CT will be diverted by operation of the solenoid S1 to the "oversize" bin.

For the short or break-down test which will be performed if the winding is not oversize, switch SW4 is closed by cam 53 (circuit III, Fig. 20). Coil SR4c is energized and contacts SR4a close to connect coil 11c of relay RE11 (circuit IV) with line 6. Relay RE11 connects 11e, 11f and 11b, 11d (circuit V). Winding CT is connected by contacts 1a, contacts 11b, 11d and 11f, 11e with coil 5c of relay RE5 which is connected by switch SW15 either with line 1 at 950 volts or with line 2 at 650 volts. Lamp L4 burns to indicate that switch SW15 is connected either with line 1 or with line 2. If the winding CT is not shorted or does not break down under high voltage, coil 5c is not energized and relay RE5 does not close its contacts 5a (circuit VI, Fig. 20). If winding CT passes direct current sufficient to cause relay RE5 to close its contacts 5a, line 6 is connected with coil 6c of relay RE6 connected with ground through normally closed contacts 13e, 13f of relay RE13. Relay RE6 separates 6b from 6a and engages 6b and 6d, thereby connecting coil 6c between line 6 and ground independently of relay RE5 which will open after the short-test period when switch SW4 opens and coil 11c of RE11 is disconnected from line 6. RE6 will remain energized during the short-test period and will not be deenergized until RE13 is energized to separate contacts 13e, 13f when coil 13c is energized by the closing of contacts SR5a as result of closing of switch SW5 at start of capacity test. The operation of relay RE6 causes solenoid SC (circuit VII) to operate the short counter. Because the winding CT fails in break-down, it will fail to retain a charge; and, as will be explained later, relay RE7 will not be energized and no capacity test can take place. Therefore neither one of the solenoids S2 and S3 will be energized. At the end of the test period, the winding CT, released from the shuttle, will descend to chute 295 to the "short" bin.

Before the capacity test, switch SW4 opens and relay RE11 is deenergized and separates 11e, 11f and 11b, 11d and closes 11a, 11b. If the winding CT did not fail in the short test, it will have a charge which is dissipated through circuit Xa (Fig. 20) which includes contacts 1a, 11a, 11b, contacts 13a, 13b and coil 7c of relay RE7 which closes contacts 7a and thereby connects line 6 (circuit XI) with closed contacts 6a, 6b of relay RE6, closed contacts 7a of relay RE7, coil 8c of relay RE8 connected by contacts SR3a to ground. Contacts SR3a remain closed until near the end of the cycle when switch SW3 closes to energize relay SR3 which operates to open these contacts. RE8 closes contacts 8b which parallel contacts 7a, 7a of RE7. Line 6 is connected with coil 8c independently of contacts 7a of relay RE7 which is energized only momentarily by condenser charge. Coil 8c of relay RE8 remains energized during the capacity test and thereafter until contacts SR3a (circuit XI, Fig. 20) open.

To start the capacity test, switch SW5 (circuit VIII) closes and energizes coil SR5c to effect closing of contacts SR5a and energization of coil 13 of relay RE13 (circuit IX) to separate contacts 13e, 13f so that relay coil 6c of relay RE6 is deenergized and the circuit to coil 7c of RE7 is broken and a connection is made by engaged contacts 13b, 13d with the resonant circuit marked RC in Fig. 18 and including the secondary of transformer TR3, resistance R4 and choke I (circuit X). The resonant circuit is then connected with lamp L6 and the winding CT through contacts 13d, 13b of relay RE13, contacts 11a, 11b of relay RE11, contacts 1a of relay RE1. Contacts 8b of relay RE8 connect line 5 with upper contact 9b of relay RE9 during the capacity test.

If the condenser winding CT is within the capacity limits, coil 9c is energized and relay RE9 closes contacts 9b (circuit XII) and opens contacts 9a (circuit XVI). Green lamp L1 (circuit XII) burns to indicate a good condenser. Switch SW2 closes at Z (bottom line, Fig. 17), coil SR2c (circuit XV) is energized to close contacts SR2a (circuit XIV) to connect coil 12c of relay RE12 with line 6. Relay RE12 closes contacts 12a, 12b (circuit XVI) and contacts 12d, 12e (circuit XIII). Solenoids S2 and S2c and relay coil 2c are connected between lines 3 and 5 by contacts 14a, 14b of relay RE14, contacts 12e, 12d of relay RE12, contacts 10b of relay RE10, contacts 9b of relay RE9 and contacts 8a of relay RE8. Trap 203 moves to position 203' (Fig. 14) and the "good" counter operated by solenoid S2c adds one. Relay RE2 closes contacts 2b (circuit XIII—A), thereby connecting wires 12 and 22 (circuit XIII—A) connected with line 5 by contacts SR7a. The circuits of coil 2c and solenoids S2 and S2c are maintained until near the end of the cycle when relay SR7 is energized by closing of switch SW7 to effect separation of contacts SR7a. The good condenser passes to the "good" bin when released by the shuttle. When relay RE2 closes contacts 2b, it opens contacts 2a in circuit XVI thereby opening a circuit to coils 14c and 15c and thereby preventing any operation of solenoids S3, S3c if the condenser is good and also preventing opening of contacts 14b, 14a in circuit XIII.

If the capacity of winding CT is below the low limit, relays RE9 and RE10 do not operate. Line 6 (circuit XVI) is connected by contacts 6a, 6b of relay RE6, wire 26, contacts 8b of relay RE8, wire 27, contacts 9a of relay RE9, wire 28, contacts 12a, 12b of relay RE12, wire 23, contacts 2a of relay RE2, wire 24, coils 14c and 15c of relays RE14 and RE15, wire 7 and contacts SR1a of relay SR1 with ground. Relays RE14 and RE15 operate. By separation of contacts 14a, 14b (circuit XIII, Fig. 20), wire 12 is disconnected from wire 29d so that solenoids S2 and S2c and coil 2c of relay RE2 are not energized. Line 6 (circuit XVII) is directly connected to wire 24 by the contacts 14d, 14e of relay RE14 and by contacts 15d, 15e of relay RE15. RE15 closes its contacts 15b (circuit XIX) and line 5 is connected with solenoids S3 and S3c. Trap 209 moves to 209' so that the winding CT, when released by the shuttle, will pass into the "capacity failure" bin. S3c causes the capacity failure counter to add one. Relay coils 14c and 15c are deenergized by opening of contacts SR1a in response to closing of switch SW1 at Y on the bottom line, Fig. 17.

If the capacity of winding CT is above the high limit, relays RE9 and RE10 operate. Energization of solenoids S2 and S2c and coil 2c is prevented by opening of contacts 10b of relay RE10. Red lamp L2 (circuit XVIII) connected between lines 3 and 5 by contacts 10d, 10e of relay RE10, contacts 9b of relay RE9 and contacts 8a of relay RE8, burns to indicate capacity above the high limit. Line 6 (circuit XVI) is connected to coils 14c and 15c of relays RE14 and RE15 through contacts 6a, 6b of relay RE6, contacts 8b of relay RE8, wire 27, contacts 10a of relay RE10, wire 28, contacts 12a, 12b of relay RE12, wire 23, contacts 2a of relay RE2, wire 24 to coils 14c and 15c connected to ground by wire 7 and contacts SR1a of relay SR1. Solenoids S3 and S3c operate as in the case of a winding CT which has capacity below the low limit.

When the resonant circuit is to be adjusted for certain low and high limits of capacity with the use of standard condensers connected at 303 and 304 (Fig. 19), switch SW12 is closed to connect line 6 with coil 8c of relay RE8, there being no condenser to be discharged through coil 7c of relay RE7 which would normally operate in case of discharge of a tested winding CT to energize coil 8c of relay RE8.

While the embodiment of the present invention as herein disclosed, constitutes a preferred form, it is to be understood that other forms might be adopted, all coming within the scope of the claims which follow.

What is claimed is as follows:

1. A machine for testing and sorting condenser windings comprising means for moving a winding to a testing station and then to a discharge station, a duct into which the winding gravitates when moved to the discharge station, a first chute connected with the duct, a first movable trap normally positioned in a non-diverting position, a first solenoid for moving said trap into position for diverting a winding from the duct into the first chute, a second chute connected with the duct, a second movable trap normally positioned to divert a winding from the duct into the second chute, a second solenoid for moving the second trap into non-diverting position, a third chute, a third trap normally in non-diverting position, a third solenoid for moving the third trap into position for diverting a winding from the second chute to the third chute, jaws for engaging the winding, a normally closed switch, means for causing the switch to open if the jaws are spaced by the winding not greater than a certain distance, an oversize test circuit including the first solenoid and two switches in series for connecting it with a current source, one being a cam-controlled switch and the other said normally closed switch, a high voltage D. C. source, a magnet coil for receiving a condenser discharge, a cam-controlled switch for connecting the winding with the high voltage source to test the winding for ability to retain a charge or with the magnet coil for discharge of the winding if it had held a charge received from the high voltage source, a capacity test circuit including an A. C. source, a resonant circuit and a current flow sensitive device, a cam-controlled switch for disconnecting the winding from the electromagnet and connecting it with the capacity test circuit, a circuit for connecting the second solenoid with a current source and including four switches in series, namely, a switch closed in response to discharge of the condenser through the electromagnet, a cam-controlled switch, normally open contacts of a first relay, a normally closed contact of a second relay, devices under control by the current flow sensitive device respectively for actuating the first and second relays when the current passed by the winding in the resonant circuit exceeds low and high limits respectively, the second solenoid being energized if condenser capacity is between the low and high limits, and means for controlling the operation of the third solenoid and including a third relay whose magnet coil is connected with a current source through normally closed contacts of a fourth relay (whose magnet coil is in parallel with the second solenoid) and in series with two pairs of contacts in parallel, namely, normally closed contacts of the first relay and normally open contacts of the second relay, a fifth relay having a magnet coil in parallel with the first solenoid and normally closed contacts for connecting the winding with the high voltage source or with the magnet coil through which the condenser can discharge or with the capacity test circuit, whereby testing for short circuit or testing for capicity is eliminated if the winding is oversize, and cams respectively for effecting the operation of the jaws, the means for moving the winding and the cam-controlled switches in timed relation.

2. A machine for testing and sorting condensers comprising a carriage having jaw supports providing jaws for engaging the side surface of a condenser winding, spring means for urging the jaw supports together whereby the jaws grip the winding, means for moving the carriage from a loading station to a test station and then to a discharge station, a fixed stop engaged by one jaw support as the carriage moves into the loading station whereby the jaws are separated to receive a condenser winding, a fixed stop engaged by the other jaw support as the carriage moves into the discharge station whereby the jaws are separated at the discharge station to permit gravitation of the winding, a duct into which the winding descends, a chute connected with the duct, a trap normally inoperative to divert a winding from the duct into the chute, a solenoid for causing the trap to move into diverting position, a solenoid control switch mounted on one of the jaw supports, a switch operating member mounted on the other jaw support, said switch being opened by said member if movement of the jaws together a certain distance as the carriage moves to the test station is not blocked by the winding, and said switch remaining closed if the winding is oversize, an oversize test circuit comprising said switch and a second switch in series therewith for connecting the solenoid with a current source, and mechanism for moving the carriage and for effecting operation of the second switch in timed relation.

3. A machine for testing and sorting condensers comprising a carriage having jaws for receiving a condenser winding between them when at the loading station, means for moving the carriage intermittently first from the loading station to a test station, second from the test station to a discharge station and then to the loading station, means responsive to movement of the carriage into the condenser loading station for effecting separation of the jaws, means responsive to movement of the carriage into the discharge station for effecting separation of the jaws, means for causing the jaws to grip the condenser winding while at the test station, a sorter into which the windings gravitate at the discharge station, electrical apparatus for testing the electrical characteristics of the condensers, means rendered operative by excessive separation of the jaws by the winding, if oversize, for conditioning the sorter for oversize winding segregation and for preventing the functioning of the electrical testing apparatus, means rendered operative by the passing of the electrical tests for conditioning the sorter for good winding segregation, and mechanism for effecting in sequence, movement of the carriage from the loading station to the test station, operation of the electrical testing apparatus, movement of the carriage from the test station to the discharge station and return to the loading station.

4. A machine for testing and sorting condensers comprising a carriage having jaws for receiving a condenser winding between them when at the loading station, means for moving the carriage intermittently first from the loading station to a test station, second from the test station to a discharge station and then to the loading station, means responsive to movement of the carriage into the condenser loading station for effecting separation of the jaws, means responsive to movement of the carriage into the discharge station for effecting separation of the jaws, means for causing the jaws to grip the condenser winding while at the test station, a sorter into which the windings gravitate at the discharge station, condenser short circuit testing apparatus, condenser capacity testing apparatus, means rendered operative by excessive separation of the jaws by the winding, if oversize, for conditioning the sorter for oversize winding segregation and for preventing the functioning of said testing apparatus, means rendered operative by the passing of both the short circuit and capacity tests by the winding for conditioning the sorter for good winding segregation, means rendered operative by the failure to pass the capacity test for conditioning the sorter for capacity failure segregation, and mechanism for effecting in sequence, movement of the carriage from the loading station to the test station, the operation of the short circuit test apparatus, the operation of the capacity test apparatus, movement of the carriage from the test station to the discharge station and return to the loading station.

5. A machine for testing and sorting condensers comprising a carriage having jaws for receiving a condenser winding between them when at the loading station, means for moving the carriage intermittently first from the loading station to a test station, second from the test station to a discharge station and then to the loading station, means responsive to movement of the carriage into the condenser loading station for effecting separation of the jaws, means responsive to movement of the carriage into the discharge station for effecting separation of the jaws, means for causing the jaws to grip the condenser winding while at the test station, a sorter into which the windings gravitate at the discharge station, means including a solenoid for conditioning the sorter for oversize winding segregation, means for connecting the solenoid with a current source and including, in series, a first cam controlled switch and a switch which is closed by abnormal separation of the jaws when gripping the winding, apparatus for electrically testing the winding, means for connecting the winding with the apparatus and including a winding engaging contact, a second cam controlled switch and a normally closed relay switch having a magnet coil in parallel with said solenoid whereby, concurrently with operation of the solenoid, the relay switch opens the circuit between the winding and the apparatus so that no electrical test of an oversize winding will be made, and mechanism for effecting, in sequence, movement of the carriage from the loading station to the test station, operation of the first cam controlled switch, operation of the second cam controlled switch, movement of the carriage from the test station to the discharge station and return to the loading station.

6. A machine for testing and sorting condensers comprising a carriage having jaws for receiving a condenser winding between them when at the loading station, means for moving the carriage intermittently first from the loading station to a test station, second from the test station to a discharge station and then to the loading station, means responsive to movement of the carriage into the condenser loading station for effecting separation of the jaws, means responsive to movement of the carriage into the discharge station for effecting separation of the jaws, means for causing the jaws to grip the condenser winding while at the test station, a sorter into which the windings gravitate at the discharge station, means including a solenoid for conditioning the sorter for oversize winding segregation, means for connecting the solenoid with a current source and including, in series, a first cam controlled switch and a switch which is closed by abnormal separation of the jaws when gripping the winding, apparatus for testing the winding for short circuit and comprising a circuit for connecting a relatively high voltage source with the winding and including a winding engaging contact, a second cam controlled switch and a normally closed relay switch having a magnet coil in parallel with said solenoid whereby, concurrently with the operation of the solenoid, the relay switch opens the circuit between the winding and the high voltage source so that no electrical test of an oversize winding will be made, a charge detecting relay having a magnet coil, means for disconnecting the winding from the high voltage source and for connecting the winding with the magnet coil of the charge detecting relay, apparatus for testing the winding for capacity, means for rendering the capacity testing apparatus effective and comprising a third cam controlled switch and a switch which closes in response to operation of the charge detecting relay if the winding is not short circuited, means rendered operative by exhibition of winding capacity between predetermined limits for conditioning the sorter for good winding segregation, means rendered operative by exhibition of winding capacity outside the predetermined limits for conditioning the sorter for segregation of a winding failing in the capacity test, and mechanism for effecting in sequence, movement of the carriage from the loading station to the test station, operation of the first and second cam controlled switches, operation of the means which disconnects the winding from the high voltage source and connects it with the charge detecting relay, operation of the third cam controlled switch, movement of the carriage from the test station to the discharge station and return to the loading station.

7. A machine for testing and sorting condensers comprising a carriage having jaws for receiving a condenser winding between them when at the loading station, means for moving the carriage intermittently first from the loading station to a test station, second from the test station to a discharge station and then to the loading station, means responsive to movement of the carriage into the condenser loading station for effecting separation of the jaws, means responsive to movement of the carriage into the discharge station for effecting separation of the jaws, means for causing the jaws to grip the condenser winding while at the test station, a sorter into which the windings gravitate at the discharge station, said sorter being conditioned normally for segregation of windings which fail in short circuit test, first, second and third cam controlled devices, a first member for conditioning the sorter for oversize winding segregation, means under joint control by the first cam controlled device and by the jaws for rendering operative the first mentioned sorter conditioning member if the jaws are abnormally separated by the winding, a condenser charge detecting relay having a magnet coil, means under joint control by the second cam controlled device and by the jaws to connect the winding first with a voltage source and then with the magnet coil of the charge detecting relay if the separation of the jaws by the winding is normal, apparatus for testing the winding for capacity, means under joint control by the third cam controlled device and by the relay to render said apparatus effective if the winding has discharged through the relay coil, a second member for conditioning the sorter for good winding segregation, means for rendering said member operative in response to exhibition of winding capacity within predetermined limits, a third member for conditioning the sorter for segregation of a winding failing in capacity test, means for rendering the second member operative in response to exhibition of winding capacity outside the predetermined limits, and mechanism for effecting in sequence, movement of the carriage from the loading station to the test station, operation of the first, second and third cam controlled devices, movement of the carriage from the test station to the discharge station and return to the loading station.

8. A machine for testing and sorting condensers comprising a carriage having jaw supports providing jaws for engaging the side surface of a condenser winding, spring means for urging the jaw supports together whereby the jaws grip the winding, means for moving the carriage from a loading station, an intermediate station at which the jaws are permitted to grip the winding and then to a discharge station, a fixed stop engaged by one jaw support as the carriage moves into the loading station whereby the jaws are separated to receive a condenser winding, a fixed stop engaged by the other jaw support as the carriage moves into the discharge station whereby the jaws are separated at the discharge station to permit gravitation of the winding, a switch mounted on one of the jaw supports, a switch operating member mounted on the other jaw support, the status of said switch being changed if movement of the jaws together a certain distance as the carriage moves to the intermediate station is not blocked by the winding, the status of said switch remaining unchanged if the winding is oversize, a sorter into which the windings pass at the discharge station and means dependent for operation upon the status of the switch remaining unchanged for conditioning the sorter for oversize winding segregation.

9. A machine according to claim 8 in which the intermediate station is a test station, said machine including apparatus for testing electrical characteristics of the condenser, means responsive to movement of the winding to the test station for making a circuit connection between the winding and the testing apparatus, and means dependent for operation upon the status of the switch remaining unchanged for interrupting the circuit between the winding and the testing apparatus.

JAMES S. BURGE.
HILTON J. McKEE.
WARREN M. RIDER.
LORIS H. CONRAD.
FLOYD J. FOUST.

REFERENCES CITED

The following references are of record in the file of this patent:

UNITED STATES PATENTS

| Number | Name | Date |
| --- | --- | --- |
| 1,482,198 | Lebeis | Jan. 29, 1924 |
| 2,015,573 | Strickland | Sept. 24, 1935 |
| 2,016,455 | Purdy | Oct. 8, 1935 |

FOREIGN PATENTS

| Number | Country | Date |
| --- | --- | --- |
| 250,957 | Great Britain | Dec. 9, 1926 |

OTHER REFERENCES

Publication by C. W. Robbins in "Bell System Technical Journal," vol. 7 (1928), pp. 708–727, particularly pp. 711 to 718.